Dec. 6, 1966     D. SILVERMAN     3,289,583

EXPLOSIVE CHARGE

Filed April 21, 1965     2 Sheets-Sheet 1

*INVENTOR*
DANIEL SILVERMAN
BY Paul F. Hawley
*ATTORNEY.*

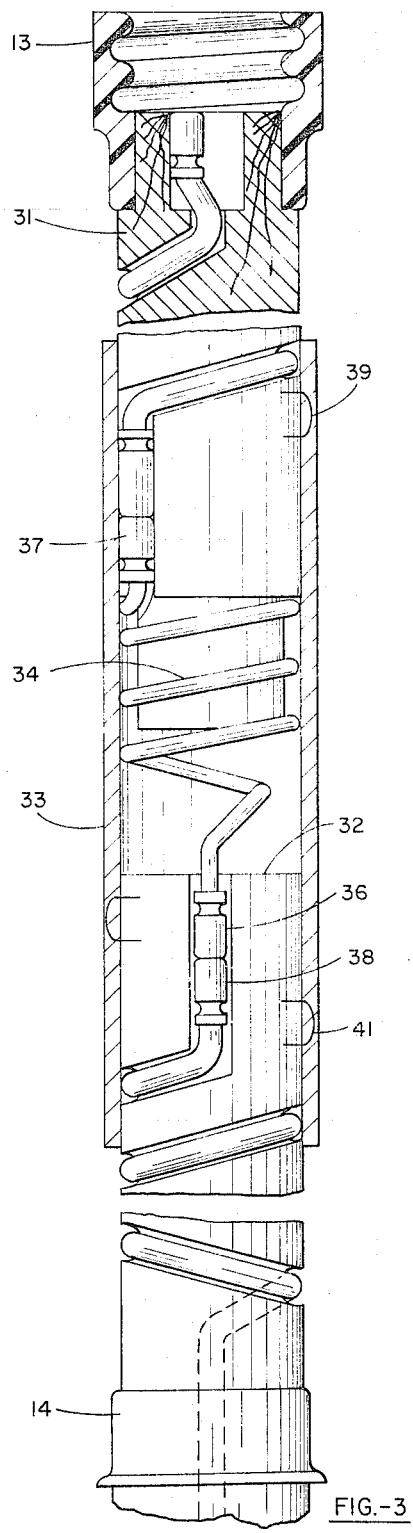
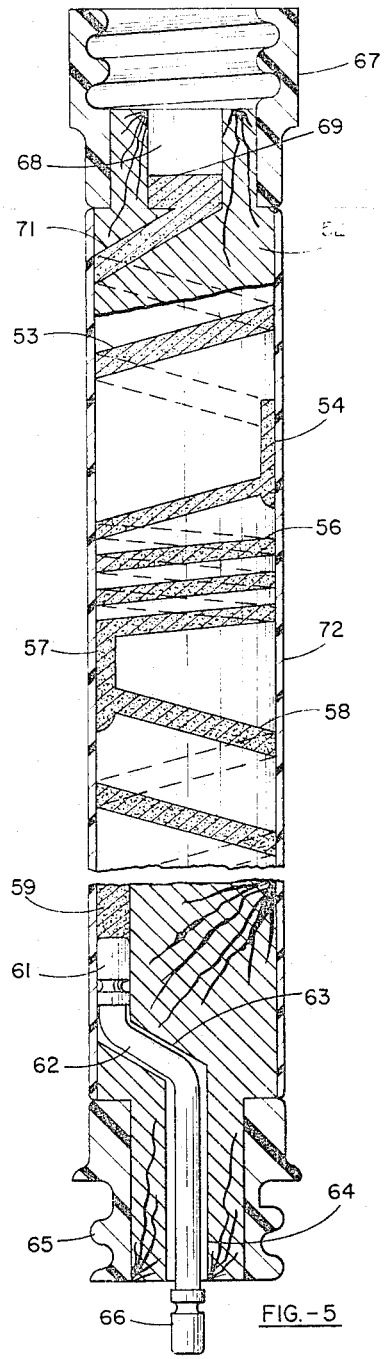
INVENTOR
DANIEL SILVERMAN
BY Paul F. Hawley
ATTORNEY.

United States Patent Office 3,289,583
Patented Dec. 6, 1966

3,289,583
EXPLOSIVE CHARGE
Daniel Silverman, Tulsa, Okla., assignor to Pan American Petroleum Corporation, Tulsa, Okla., a corporation of Delaware
Filed Apr. 21, 1965, Ser. No. 449,836
6 Claims. (Cl. 102—20)

This invention relates to improvements in an article of manufacture, namely an explosive charge assembly. More specifically, it deals with a type of explosive charge used in prospecting for petroleum by the seismic method. In the seismic method it is common practice to generate seismic waves in the earth by detonating, in one or more boreholes, charges of dynamite or similar explosive.

In my patent, U.S. 3,150,590, I show that the use of the conventional localized or concentrated explosive charge produces, in addition to the desired seismic waves, interfering waves which may seriously impede the reception and interpretation of the desired seismic signals. To minimize the strength of certain types of these deleterious waves, the aforementioned patent teaches a method of operation that uses a uniquely constructed explosive charge. Such charges employ helically distributed explosive assemblies in which the axial velocity is selected to be approximately equal or bear a chosen relationship to the seismic wave velocity in the formation surrounding the borehole. Detonation of this type charge imparts a directional effect to the resulting seismic waves. In using these charges, it is normal practice to detonate the charges downward, beginning at the top, thus generally directing the seismic energy downward.

Such helical charges, constructed in accordance with the teachings of my U.S. Patent 3,150,590, do, indeed, generate desirable seismic waves. However, certain of the charges are somewhat limited in their usefulness because of their inability to operate throughout the required velocity range. Specifically, one limitation is the failure of such charges to detonate reliably at velocities below about 6,500 feet per second. Another limitation is the failure to detonate reliably after being submerged for a number of hours at normal seismic shot depths, as may be required by operating circumstances. The present invention teaches construction features and operating procedures which are novel and constitute improvements to helically distributed seismic charges of the general type described in my above-mentioned U.S. Patent.

The commercial form of distributed charges, constructed in accordance with the teachings of my aforementioned patent, comprises a wooden dowel rod or similar cylindrical member of destructible material such as cardboard or molded plastic approximately one and three-eighths (1⅜) inches in diameter and several feet in length. Hollow cylinders may also be used. Into the surface of such cylindrical member is cut a helical groove extending continuously from essentially one end of the rod to the other. A linear cord-like explosive of the general type known as Primacord is wound in this groove. The explosive commonly used for this purpose contains from about 40 to about 100 grains of detonating material per lineal foot, or generally in excess of 30 grains per foot. These cord explosives detonate with a predictable velocity. Therefore, by selecting an appropriate length of explosive cord per unit length of rod, a desired axial detonation velocity is produced in the assembly. As an example of this method of axial detonation velocity control, let us consider the simple case of a charge constructed to fire with a velocity of 5,000 feet per second. This is equivalent to a velocity of five feet per millisecond. If we assemble this charge on a five-foot wooden rod, we must use a length of explosive cord which will detonate from end to end in exactly one millisecond. This length will be deployed in the form of a helix that extends essentially from end to end of the five-foot long rod. One of the explosive cords which is suitable for this purpose has a linear detonation velocity of 22,000 feet per second. This is equal to 22 feet per millisecond. So to produce an axial detonating velocity equivalent to five feet per millisecond, a millisecond length, 22 feet, of this detonating cord must be made to occupy five feet of assembled charge length. Accordingly, the length of explosive cord needed for other axial detonating velocities may also be determined by the relationship shown above. This may be expressed as:

$$\text{Cord length} = \frac{\text{assembly length}}{\text{axial detonation velocity}} \times \text{cord detonating velocity}$$

It may be seen from this equation that as the axial detonating velocity is made lower, greater lengths of Primacord are required. As the Primacord length is increased, the turns of the helix must be placed closer together. When this is done, the wood of the pole which remains standing between helical grooves becomes increasingly narrower.

It has been found that this web of wood between helical grooves serves as a cushion to prevent each increment of the progressing detonation from damaging the succeeding turn of explosive cord, that cord to which the detonation has not yet advanced. If this web of wood between turns of explosive cord is reduced below a particular width, the cushion effect becomes inadequate and detonation of the assembly is unreliable. The cushion effect of this wood partition between turns is also markedly decreased when it becomes water saturated. While this effect is of little importance if the charges are loaded into the borehole and fired within a few minutes, it becomes a limiting factor to satisfactory performance of the charge assembly if it is loaded into a borehole for use some hours later. This effect produces failure of the low velocity charges in a shorter submersion time than in the case of charges constructed to produce higher axial detonation velocities, those which have turns spaced farther apart. Specifically, a charge constructed to fire at a velocity of 6800 feet per second will have a wood divider between turns of explosive cord in one commercial assembly which is about ⅝ inch thick. Such charges will fire satisfactorily for several hours after being placed below about 200 feet of water in a shot hole, but will not operate with acceptable reliability when left submerged for a day or more. A charge constructed to detonate at 8,000 feet per second will have wood between turns of the cord which has a thickness of approximately an inch. Such charges will withstand several days of immersion before becoming unreliable. Charges made for operation at greater detonation velocities, say 9,000 feet per second, have the turns of explosive cord spaced far enough apart that the cushion afforded by the wood barrier of the lower velocity charges is not necessary. In this case water saturation of the wood produces no deleterious effect and the charge may be left submerged indefinitely.

Moreover, in the range which is near the minimum reliable detonation velocity, I have observed another effect which makes impractical the construction of charges in low detonation velocity ranges, where this is done by closely spacing the turns of the helix. Measurements made of the actual detonation velocity of all of the common type of cord-like explosives show that at less than a certain spacing between turns the detonation velocity increases as the turns of the helix are positioned closer together. This increase in firing speed results when the cord is fired within the high temperature and pressure field produced by detonation of the cord on the preceding turn of the helix. Such an increase in cord velocity requires that a greater length of cord be used to produce a desired assembly propagation rate, since more cord is consumed per unit of time at such accelerated detonation velocities. So, to position this increased cord length on a given pole, the turns must be even closer together. The two effects operate jointly to abruptly limit the minimum velocity for which reliable charges may be constructed by this means. This minimum satisfactory spacing between turns is a function of charge weight and the cushion between turns. This is the radius of mutual destruction.

The present invention essentially permits elimination of this effect; turns of the explosive cord may be adequately spaced apart to allow reliable operation of the explosive at its normal velocity. While a controlled amount of this speed-up effect is not, of itself, detrimental to the operation of these distributed charges, it does reflect adversely on the manufacturing cost of such a charge. I have found that the cost of the explosive cord used in the fabrication of a charge of this construction is the greatest single cost item of the many factors which must be included. It is, therefore, economically important that charge constructions be used which employ the least amount of explosive cord consistent with the required charge detonation velocity.

In this connection I have observed that where the turns of explosive are placed too near each other, but still not so near that damage to the succeeding turn will cause a misfire, the velocity of detonation of the cord may increase from a normal velocity of 22,000 feet per second to as much as 26,000 feet per second. Such an increase in velocity may make necessary the use of an additional 16 to 18 percent of cord, with, of course, a corresponding increase in the cost of the charge. In the past, spacing apart the turns of explosive cord by a sufficient distance to avoid speed-up of the detonation has produce explosive assemblies with axial detonation velocities in the range of 8,000 to 10,000 feet per second. Such charges have only limited areas of usefulness.

With the construction taught by the present invention, a closely spaced helix of small detonating cord may be added in series with the principal element of larger cord to provide a section of very slow axial detonation velocity. The relative lengths of the respective small and standard size explosive cords in this way may be chosen to produce the required axial detonation velocity and at the same time to construct charges which use a minimum length of cord for the operating characteristics which are sought.

It has been found that the lowest velocity which can be reliably achieved with 60 grain per foot explosive and on a pole of 1⅜″ diameter, is about 6.5 lineal feet per millisecond. It is an object of my invention to teach an improved charge construction that will detonate at velocities as low as the propagation velocity of acoustic waves in water, approximately 5 feet per millisecond, and to achieve reliable operation of such charges even though they may be submerged under several hundred feet of water for many hours before being detonated.

Another object is to provide a construction of helical explosive charge which can be readily adjusted to detonate with any desired velocity within the requirements of seismic exploration.

A further object of my invention is to demonstrate the construction of a helically distributed explosive assembly in which the explosive weight of the assembly may be adjusted to conform to seismic requirements, while at the same time the detonation velocity may be held constant or varied independently of the charge weight.

Yet another objective of my invention is to provide a distributed seismic charge which employs a bulk-type, putty-like explosive in place of the commercial cord-like explosive, such as Primacord.

The operation of these devices and the manner in which my invention accomplishes its objectives will be better understood by the following description and the appended figures.

FIGURE 3 is a partial cross-sectional view of a helical distributed charge embodying, among others, the feature of adjustable propagation velocity.

FIGURE 5 is a cross-section view of a helical distributed charge structure whose principle explosive elements consist of one or more continuous filaments of explosive formed directly in the helical groove of the support structure.

Figure 1:
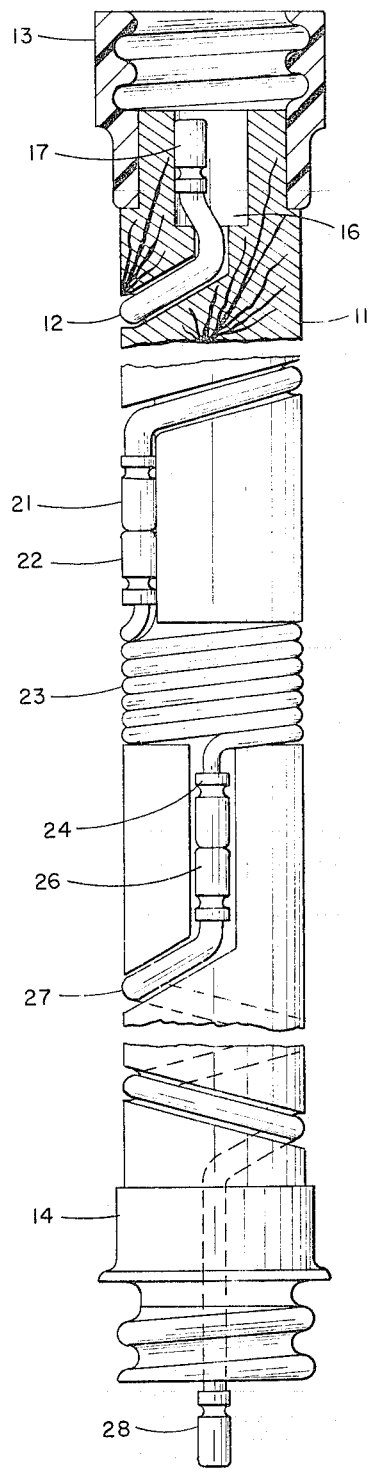
FIGURE 1 is a partial sectional view of a helical-type distributed charge which embodies several of the features of the invention and is described in detail hereinafter.

I have shown how, as the spacing of turns of the explosive cord is reduced, two important conditions arise. One is the buildup of pressure and temperature in the region of instantaneous detonation arising from the detonation of the previous turn, and the second is the danger of explosive damage by the detonating turn to the next turn in advance. This effect can be minimized by placing a barrier between adjacent turns of the helix which can absorb some of the shock force of the detonation. However, this expedient is not fully satisfactory.

In this invention I deliberately avoid this condition by designing the spacing of the helix such that it is greater than the spacing $D_0$, which is the spacing for mutual destruction. With spacings greater than $D_0$ there is consistent and uniform detonation. However, making the spacing greater than $D_0$ is not going to help when the desired axial velocity of detonation V calls for a spacing D which is less than $D_0$.

I have found that the spacing $D_0$ for mutual destruction is a function of the explosive power of the linear explosive, that is, the charges weight C per unit length. The larger C, the larger the spacing $D_0$. So by going to a small enough value of C, I can bring $D_0$ equal to or less than the desired value of D for the desired velocity V. In order to provide as much total explosive power as possible, I make the helix in two parts; a first part of axial length $L_2$ composed to explosive of large value $C_2$ of charge per unit length, and of helix spacing $D_2$ greater than $D_{2_0}$, the spacing for mutual destruction for the explosive of weight $C_2$. This is a helix of large detonating cord. To compensate for the fact that this helix now has an axial velocity of detonation $V_2$ greater than V, the desired value, I add a second part of the helix of length $L_1$, composed of explosive of small value of charge per unit length $C_1$ and corresponding helix spacing $D_1$ less than D, (corresponding to V) but again greater than $D_{1_0}$. This is a helix of small detonating cord. Each of the two segments of helix has a different axial velocity of detonation, $V_2$ greater than V and $V_1$ less than V. However, the lengths $L_2$ and $L_1$ are so chosen that $$\frac{L}{V} = \frac{L_1}{V_1} + \frac{L_2}{V_2} \text{ and } L = L_1 + L_2 \quad (1)$$

from which follows the relations that $$L_2 = \frac{LV_2}{V_1} \frac{(V_1 - V)}{(V_1 - V_2)} \text{ and } L_1 = L - L_2 \quad (2)$$

This provides a composite linear explosive charge comprising two segments, one of large explosive power of velocity greater than V and the other of low explosive power of velocity less than V. By choosing the relative lengths of the two segments the average velocity of detonation will be equal to V, and both helices will be wound with turn spacings greater than the values (corresponding to the charge weights per unit length) for mutual destruction. Thus no protection is needed between turns of the helices and they will detonate consistently irrespective of the length of time of immersion.

By going to the limit with the explosive of low charge weight per unit length, that is, making the charge weight of the small detonating cord less than 10 grams per foot, for example, the spacing between turns can be reduced to a small value (essentially the diameter of the explosive element itself—which may be ⅛ to ¼ inch), permitting a maximum length of helix of large charge per unit length. However this invention is not limited to the use of this very small detonating cord in the second helix.

The operation of the preferred embodiment of my invention will be understood by referring to FIGURE 1 wherein a wooden pole 11 is wound with a linear cord-like explosive 12 and is terminated on either end by threaded couplings 13 and 14, respectively. This is a cord of about 40–100 grains of explosive per foot. Linear cord-like explosive 12 originates in a recess 16 cut in the end of wooden pole 11. A thin metal protective shell 17 is crimped over the end of the explosive cord to prevent the entrance of water.

In the operation of this explosive structure, detonation is usually initiated at the upper end of the assembly, as illustrated in FIGURE 1. That is, the projecting end of the explosive cord of the preceding explosive structure may be inserted into the cavity 16 to lie adjacent the protecting shell 17 and the end of the explosive cord contained therein. Successive pole assemblies are joined by threading male coupler 14 into female coupler 13 of the adjacent structure.

Figure 2:
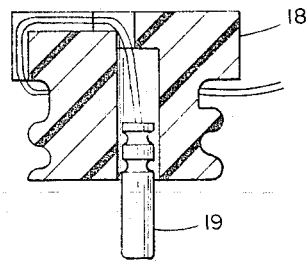
FIGURE 2 is a cross-sectional view of an electric blasting cap and holder adapted for use with the seismic charge shown in FIGURE 1.

Alternatively, as shown in FIGURE 2, priming may be accomplished by the use of detonating cap holder 18, which by being threaded into female coupler 13 (in FIGURE 1) brings electric blasting cap 19 into proximity with the end of detonating cord 12 which is contained within protective shell 17 (FIGURE 1). Continuing with reference to FIGURE 1, when detonation is initiated at the above-mentioned end of the explosive assembly, it progresses downward following the helix of the explosive cord, advancing along the cord at the characteristic detonation rate of the cord itself and moving axially along the wooden pole at a rate determined by the helical pitch and the detonation rate of the linear cord-like explosive. Detonation proceeds until it reaches the end of the cord within protective shell 21.

At this point, detonation progresses from the explosive within shell 21 to a mild booster 22 attached at one end of a small explosive cord 23. This cord 23 contains an explosive charge in the range of one to ten grains per foot, and is placed with its turns in a helical fashion about the wooden pole 11 and spaced apart usually by ¼ to ⅛ inch though in some cases the turns may touch each other. This close spacing is operable because this type of cord is characterized by an explosive charge so small that the cord has little or no destructive force. Commercially such cord is known as Du Pont Mild Detonating Fuse (MDF) or Low Energy Detonating Cord (LEDC), available from Ensign-Bickford Products Division, Darworth, Inc., Simsburg, Connecticut. Because of the extremely small charge in detonating cords of this type they are usually incapable of initiating detonation in the larger sizes of cord. To provide increased explosive force at the point where the small cord is joined to the large, a booster charge consisting of a few grains of explosive in a metal shell is used. A standard blasting cap used with fire fuse may be employed in this place. Preferably, however, a small booster known as Mild End Primer is installed at this point. Since the explosive propagation velocity of this cord is essentially the same as that of the large cord 12 while the pitch is less, the axial progress of detonation in the pole structure is slowed by the time interval consumed as the detonation moves along the considerable length of the helix of small cord. Upon arriving at the end of the small cord 23, the detonation encounters mild explosive booster 24, where the level of the detonation is increased to a point sufficient to initiate the large size detonating cord 27, the end of which is contained within protective shell 26. The detonation then proceeds along the large detonating cord 27 to arrive eventually at the lower end within protective shell 28.

The object of the foregoing construction is to produce a detonating structure in which the propagation moves from end to end. At these ends, only the large detonating cord is employed. A decrease in average propagation velocity is obtained as a result of the additional length of cord involved in the helix of small detonating cord 23 which is wound at a helix angle to provide a low axial velocity of detonation.

Referring to FIGURE 3, I illustrate the second objective of my invention which is to provide a construction of explosive structure wherein the average detonation velocity from end to end of the explosive structure may be adjusted by the user to comply with immediate seismic requirements. In this construction wooden pole 31 is divided into two parts by transverse cut 32 and retained in end-to-end relationship by surrounding tube 33, made of paper, plastic, or the like. In this modification of the charge, which is otherwise as described previously, the two parts of the wooden pole may be separated and withdrawn for a part of the length of surrounding tube 33. As this is done, the turns of small detonating cord 34 which are anchored in mild end primers 36 and 37, but loosely mounted on the support, are caused to separate as they slide endwise from their seated position adjacent the transverse cut of wooden pole 31, thus allowing mild end primer 36 and protective shell 38 to maintain their explosive propagating relationship. Extending the length of the explosive assembly in this manner does not change the time required for detonation to proceed from end to end but does serve to decrease the time per unit length of structure, hence to increase the average velocity of the detonation in the axial direction. To illustrate this point, let us consider a five-foot long explosive structure which employs a total length of explosive cord, that is, the sum of the large and small cord segments, which equals 22 feet in length. If the propagation velocity of these cords is 22,000 ft./sec., the time required for propagation to move axially from end to end in the structure will be 22 feet divided by 22,000 ft./sec. or 1/1000 of a second. Therefore, if the detonation traverses a five-foot explosive structure in 1/1000 second, it has a velocity of 5,000 feet per second. If the structure of FIGURE 3 is now extended to a length of six feet, the time required for detonation from end to end will remain at 1 millisecond, but the detonation velocity will now be six feet per millisecond, or 6,000 feet per second. These figures are cited to illustrate the operation of the adjustable feature of my invention but are not to be regarded as establishing the limits within which a structure of this type may be adjusted. Calibration marks may be located on the wooden pole to indicate the velocity which will be achieved by withdrawing the pole with respect to the surrounding tube 33. Having made such an adjustment, the two parts of the wooden pole 31 and the surrounding tube 33 are retained in the desired relationship by staples 39 and 41 or by clamps (not shown) which crimp surrounding tube 33.

It will be understood that the second, low-unit-weight explosive element, consisting of small detonating cord 34, described above, may be placed at any point throughout the length of wooden pole 31. Although the preferred embodiment of this invention places the slowing link at or near the center of pole 31, it may be located adjacent to either the male or female coupling ends of the structure.

Figure 4:
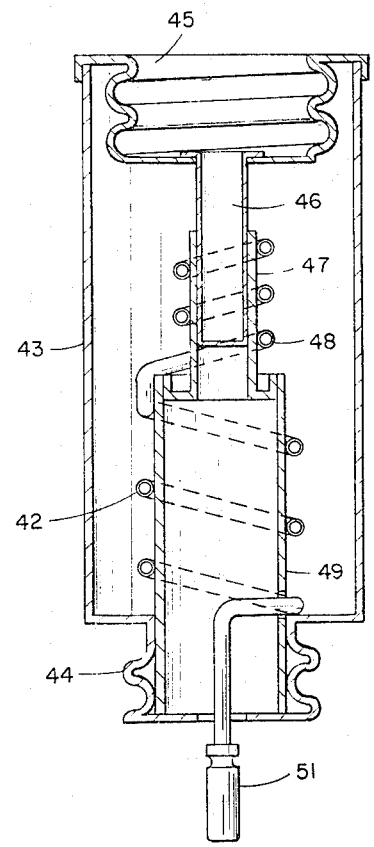
FIGURE 4 is an illustration of a propagation-slowing element similar in construction to the propagation-slowing element incorporated in FIGURE 1 but disassociated from the construction of FIGURE 1.

Still another manner in which the detonation-slowing element may be introduced into an assembly of explosive charges is illustrated in FIGURE 4. Here the helix of small detonating cord 42 is incorporated in a separate container 43 fitted with male threads 44 and female threads 45 to permit the container to be threadably coupled between helical distributed charges which may or may not themselves incorporate similar slowing elements as described with reference to FIGURE 1. This unit is short compared with the unit shown in FIGURE 1 and typically is from 3 to 6 inches long.

The operation of this device is as follows. When the female end 45 of the container of FIGURE 4 is threadably engaged with the male coupler 14 of FIGURE 1, the projecting explosive shown as 28 in FIGURE 1 is inserted into well 46 which is comprised of a thin metallic shell. Around well 46, support tube 47 carries a few helical turns of small detonating cord 48. This explosive 48 is initiated by the detonation of the projecting explosive 28 of FIGURE 1 which now is within the turns of small cord wound on supporting tube 47. This small cord communicates in an unbroken helical winding with the balance of the small detonating cord wound on larger support tube 49. The small detonating cord upon reaching the end of the helix extends downward through the male threaded fitting 44 to terminate in mild end primer 51 by which detonation is initiated in the succeeding explosive structure.

The principal advantage of an axial propagation-slowing element of the type described above is one of convenience. In a preferred embodiment, this structure would have an axial dimension in the range of 3 to 6 inches.

It may, therefore, be inserted between poles of a distributed charge assembly to reduce the over-all propagation velocity without essentially changing the length of the charge assembly.

Although the foregoing description has dealt with a cord-like explosive wound into a groove cut into the surface of a supporting structure, another type of explosive may be used in a similar construction to achieve essentially the same results as provided by cord-like explosives. Explosive compositions of this type are made to be extremely viscous or putty-like. They are inherently resistant to water and do not require a protective jacket of tarred fabric, plastic, or the like. One commercial explosive of this type is known as Du Pont EL506. In constructing a helical distributed charge using this type of explosive, it is extruded or otherwise placed directly in the helical groove of the support member. Protection against loss of this material by abrasion or other means is provided by an overwrap of paper, fabric, or plastic sheet.

Several advantages acrue from this type of construction. One of these is greatly reduced fabricating cost. Another is the elimination of the plastic jacket of the cord-like explosive which frequently fouls the borehole and renders loading of subsequent charges difficult. Still another advantage results from the use of fabricating techniques which are more economical than those used when explosive cord is wound onto the supporting structure.

Yet another advantage from this type construction is due to the fact that where two explosive elements of greatly different cross-sections are joined, detonation may be sustained without the use of booster or repriming charges. Construction details of charges utilizing putty-like explosive compositions which are formed directly into helical grooves cut in the surface of support members will be illustrated and described later.

The construction and operation of a linear distributed charge of the type illustrated in FIGURE 5 is as follows: Into the surface of support structure 52 is cut a helical groove 53 extending a part of the distance between ends of the support structure. Groove 53 terminates in a transition zone 54 where the cross-section area of the groove is reduced to from 5 to 25 percent of the cross-section of groove 53. The small groove 56 extends continuously from transition zone 54 and lies in the form of a closely spaced helix on support structure 52. At the termination of closely spaced helix 56, the groove of this helix leads into transition zone 57 where the cross-section area is increased to that of the groove 53. From this transition zone 57, the large groove 58 now continues along support structure to transition zone 59. In the cavity of transition zone 59, the cross-section area of groove 58 is increased to permit inclusion of end protective cap 61 and detonating cord 62 (Primacord, or similar), which then extends from the surface into support member through diagonal borehole 63 to axial borehole 64, thence beyond end coupler 65 to terminate in end protective shell 66.

In operation, this charge is threadably coupled to the male fitting of the adjacent pole by female coupler 67. When so coupled, the explosive cord projecting from the male fitting occupies well 68 and lies in explosive propagating relationship with detonating material 69, which material is, in turn, in explosive propagating relationship with the explosive material in helix 53, by virtue of slant borehole 71 and the explosive filling therein. To provide protection against abrasion and water current erosion during the earth borehole loading process, support structure 52 is encased by an overwrap 72 consisting of waterproof paper, fabric, or plastic sheet.

While I have described my invention with regard to the preferred embodiments illustrated, it is to be understood that further modifications and additional embodiments will be apparent to those skilled in the art. For example, since a barrier between turns is not required, it is possible to wind the detonating cords on the surface of the cylindrical mandrel rather than in grooves cut into the surface. This permits the use of thin-walled tubular mandrels which may be of wood, paper, plastic or similar materials. Therefore, my invention is not limited to the details of the embodiments illustrated but to the scope defined by the appended claims.

I claim:
1. In a linear charge assembly in which the charge comprises at least two segments of helically disposed linear explosive composition, of two different values of charge per unit length $C_1$ and $C_2$, in which one segment comprises a small value of charge per unit length, $C_1$, formed in a helix of small angle, and small axial velocity of detonation, $V_1$, and another segment comprises a large value of charge per unit length, $C_2$, formed in a helix of large angle, and large axial velocity of detonation, $V_2$, in which the total length of charge is $L$ and desired average axial velocity of detonation is $V$, and the corresponding values for the two segments are $L_1$, $V_1$ and $L_2$, $V_2$, respectively, and the limiting values of $V_1$, $V_2$ on the low velocity end, namely $V_{1_0}$, $V_{2_0}$ correspond respectively to the minimum spacing of turns without self-destruction of the explosive material, the value of $V$ being less than the value $V_{2_0}$, the method of construction comprising,
   (1) forming a substantially rigid cylindrical member of length $L$,
   (2) winding on said member a length of linear explosive of charge per unit length $C_2$ to form a helix of length $L_2$ and of axial velocity of detonation of $V_2$, where $V_2$ exceeds $V_{2_0}$, $V_1$ exceeds $V_{1_0}$, and

$$L_2 = \frac{LV_2}{V} \frac{V_1 - V}{V_1 - V_2}$$

(3) winding on said member adjacent said first winding a length of linear explosive of charge per unit length $C_1$ to form a helix of length $L_1$ and of axial velocity of detonation of $V_1$, where $L_1 = L - L_2$, and
   (4) joining the two segments of helix in explosive detonation relation, whereby a linear explosive charge assembly is formed for which the axial velocity of detonation $V$ is less than the velocity $V_{2_0}$ of self-destruction of the helix of charge per unit length $C_2$.

2. A linear explosive charge element adapted to be fastened in linear combination with at least one or more similar elements to form an explosive charge assembly for detonation below the surface of the earth, each charge element being of such a length as to be easily handled at a shot point, and each element adapted to be constructed for a predetermined average velocity of propagation of detonation along the axis of the element which is substantially matched to the velocity of elastic wave propagation in the earth material adjacent the explosive element, comprising, (1) a linear substantially rigid cylindrical support member,
(2) means forming a pattern of helical guides at the surface of said support member adapted to guide the placement of a length of cordlike explosive element,
(3) said guides occupying substantially the entire length of said support member,
(4) said pattern of guides comprising at least two segments, each segment having a different helical angle from the other segment,
(5) cordlike explosive composition placed in said helical guides and extending from end to end of said member, the composition in the helix of greatest angle being larger in charge weight per unit length than the composition in the helix of smallest angle,
(6) the helical angle of said guides having the larger weight per unit length of composition in one segment, being such that with the known velocity of detonation of said explosive, the velocity of propagation of detonation along the axis of said element in said segment is greater than the velocity of propagation of elastic waves in the adjacent earth material,
(7) the helical angle of said guides having the smaller weight per unit length of composition in the other segment, being such that with the known velocity of detonation of said explosive the velocity of propagation of detonation along the axis of said element in said other segment is less than the velocity of propagation of elastic waves in the adjacent earth material, whereby the average velocity of propagation of the detonation along the axis of said support member from one end to the other is intermediate between the velocity of propagation in the two segments.

3. The apparatus of claim 2 in which the number of turns and the helix angle in earth of the two segments is adjusted to make the average velocity of propagation of detonation along the axis of the support member matched to the elastic wave velocity in the adjacent earth material.

4. The apparatus of claim 2 in which the helix angle in the segment of smallest angle is substantially the smallest angle possible limited by the dimension of said explosive composition.

5. The apparatus of claim 2 in which the weight per unit length of explosive in each helix is chosen to be less than the weight causing explosive destruction of the adjacent turns of the explosive helix.

6. The apparatus of claim 5 in which the weight per unit length of explosive in the segment of largest helix angle is in the range of 4 to 50 times the weight per unit length of explosive in the segment of smallest helix angle.

References Cited by the Examiner

UNITED STATES PATENTS

| | | | |
|---|---|---|---|
| 2,609,885 | 9/1952 | Silverman | 181—.5 |
| 2,992,611 | 7/1961 | Felch | 102—22 |
| 3,112,699 | 12/1963 | Noddin | 102—1 |
| 3,131,633 | 5/1964 | Eisler et al. | 102—21.6 |
| 3,150,590 | 9/1964 | Silverman | 102—21.6 |

SAMUEL FEINBERG, *Primary Examiner.*
BENJAMIN A. BORCHELT, *Examiner.*
V. R. PENDEGRASS, *Assistant Examiner.*